(12) United States Patent
Carpenter et al.

(10) Patent No.: US 10,927,996 B2
(45) Date of Patent: Feb. 23, 2021

(54) WALL MOUNTED ELECTRONIC DEVICE AND CORRESPONDING METHOD FOR MOUNTING

(71) Applicant: INTERDIGITAL MADISON PATENT HOLDING, SAS, Paris (FR)

(72) Inventors: Joseph Lee Carpenter, Noblesville, IN (US); Sin Hui Cheah, Carmel, IN (US)

(73) Assignee: INTERDIGITAL MADISON PATENT HOLDINGS, SAS, Paris (FR)

(*) Notice: Subject to any disclaimer, the term of this patent is extended or adjusted under 35 U.S.C. 154(b) by 0 days.

(21) Appl. No.: 15/768,725

(22) PCT Filed: Oct. 26, 2016

(86) PCT No.: PCT/US2016/058843
§ 371 (c)(1),
(2) Date: Apr. 16, 2018

(87) PCT Pub. No.: WO2017/075039
PCT Pub. Date: May 4, 2017

(65) Prior Publication Data
US 2018/0306378 A1 Oct. 25, 2018

Related U.S. Application Data

(60) Provisional application No. 62/247,376, filed on Oct. 28, 2015.

(51) Int. Cl.
*F16M 11/04* (2006.01)
*F16B 21/09* (2006.01)
(Continued)

(52) U.S. Cl.
CPC ............ *F16M 11/04* (2013.01); *F16B 21/09* (2013.01); *F16M 11/041* (2013.01); *F16M 13/02* (2013.01); *H05K 5/0213* (2013.01)

(58) Field of Classification Search
CPC ...... F16M 11/04; F16M 11/041; F16M 13/02; F16B 21/09; H05K 5/0213
(Continued)

(56) References Cited

U.S. PATENT DOCUMENTS 4,128,354 A * 12/1978 Amrogowicz ......... B65D 19/12
217/43 A
4,893,777 A * 1/1990 Gassaway ............ E05B 73/0082
211/8

(Continued)

FOREIGN PATENT DOCUMENTS

| CA | 1073861 A | 3/1980 |
| CN | 1566740 A | 1/2005 |

(Continued)

OTHER PUBLICATIONS

Surface Mounted Keyhole Bed Rail Brackets—90° Bracket Set—Rockler Woodworking Tools; retrieved on the Internet Sep. 14, 2015.

*Primary Examiner* — Monica E Millner
(74) *Attorney, Agent, or Firm* — Jerome G. Schaefer

(57) ABSTRACT

A wall mount for an electronic device includes two screw or hook receiving keyhole apertures. The two keyhole apertures have different geometric shapes with respect to each other such that the locked mounting positions of the two corresponding mounting screws or hooks which would engage the same are neither laterally nor vertically aligned with each other.

13 Claims, 6 Drawing Sheets

(51) Int. Cl.
*F16M 13/02* (2006.01)
*H05K 5/02* (2006.01)

(58) Field of Classification Search
USPC .................. 248/222.51, 222.52, 223.21
See application file for complete search history.

(56) References Cited

U.S. PATENT DOCUMENTS

| | | | |
|---|---|---|---|
| 5,845,977 A | 12/1998 | Neukam et al. | |
| 7,909,295 B2* | 3/2011 | Powers | G06F 1/1601 248/121 |
| 8,251,325 B2* | 8/2012 | Molter | F16M 11/105 248/222.51 |
| 8,979,049 B2* | 3/2015 | Yoshida | F16M 13/02 248/224.51 |
| 9,732,784 B2* | 8/2017 | Clouser | F16M 11/08 |
| 2004/0211870 A1* | 10/2004 | Bremmon | F16M 11/10 248/284.1 |
| 2008/0237434 A1 | 10/2008 | Watt | |
| 2011/0163215 A1* | 7/2011 | Walters | F16M 11/2092 248/220.22 |
| 2013/0306816 A1 | 11/2013 | Yoshida | |
| 2015/0070839 A1* | 3/2015 | Johnson | B60R 11/00 361/679.56 |
| 2017/0234647 A1* | 8/2017 | Schweitzer | F41C 33/0209 224/587 |

FOREIGN PATENT DOCUMENTS

| | | |
|---|---|---|
| CN | 201462357 U | 5/2010 |
| CN | 102691863 A | 9/2012 |
| EP | 2610538 | 7/2013 |
| FR | 2365320 | 4/1978 |
| JP | 2001144461 | 5/2001 |
| WO | WO2008054720 | 5/2008 |

* cited by examiner

WALL MOUNTED ELECTRONIC DEVICE AND CORRESPONDING METHOD FOR MOUNTING

CROSS REFERENCE TO RELATED APPLICATIONS

This application claims the benefit, under 35 U.S.C. § 365 of international application PCT/US16/058843, filed on Oct. 26, 2016, which claims the benefit of and priority to the U.S. provisional application 62/247,376, filed on Oct. 28, 2015. The PCT and US applications are herein incorporated by reference in their entirety and for all purposes.

TECHNICAL FIELD

The present principles relate to wall mounted electronic devices. More particularly, it relates an apparatus and method for securely mounting electronic devices on walls or structures.

BACKGROUND

Typically, in for most devices to be mounted on a wall, they require a separate wall bracket that either attaches to the device first, then to the wall, or attaches the bracket to the wall first and then the device attaches to it.

Many of such devices have wall mount hooks molded on the back of a device that then allow the device to slip over the screw head and slide down or sideways. These wall mount hooks tend to be what are referred to as keyhole apertures, having a larger portion configured to receive the head of the screw, and a smaller portion configured to receive the shaft of the screw, thus locking the same into a mounted position.

The problem with these wall mount hooks is they are often configured for the homeowner to install, and therefore are oriented in the same position (e.g., upright, or sideways) and therefore aligned with each other to ease the installation. However, with this existing design, if the mounted electronic device is bumped, the screw head can sometimes become dislodged from the keyhole wall mount hooks because the same only require one direction of movement to become dislodged (or lodged when installing).

It is therefore an aspect of the present principles to overcome the shortfall of the known keyhole wall mount hooks, to provide a more secure mounting, while maintaining the ease for the user to install the same.

SUMMARY

This summary is provided to introduce a selection of concepts in a simplified form as a prelude to the more detailed description that is presented later. The summary is not intended to identify key or essential features of the invention, nor is it intended to delineate the scope of the claimed subject matter.

According to one embodiment, an electronic device mounting apparatus includes an electronic device mounting plate having a first mounting keyhole having a first geometric shape on a surface thereof, and a second mounting keyhole in the same surface thereof and having a second geometric shape that is different from the first geometric shape.

The electronic device mounting apparatus further includes a first mounting plate retainer and a second mounting plate retainer positioned with the mounting plate, where the first and second geometric shapes cause the first mounting plate retainer and second mounting plate retainer to be at different vertical positions on the mounting plate with respect to each other. The first geometric shape comprises one of a pear shape or an L-shape, and the second geometric shape comprises the other of the pear shape or L-shape. At least a portion of the second geometric shape is not horizontally aligned with any part of the first geometric shape. A larger receiving portion of the second keyhole is elongated and horizontally aligned with both a larger receiving portion and a smaller receiving portion of the first keyhole.

In one embodiment, an electronic device assembly includes an electronic device, and a first mounting keyhole positioned in a mounting plate of the electronic device and having a first larger receiving portion (30) transitioning to a first smaller receiving portion. The assembly also includes a second mounting keyhole positioned in the mounting plate of the electronic device and having a second larger receiving portion transitioning to a second smaller receiving portion. An orientation of the first smaller receiving portion is different than an orientation of the second smaller receiving portion.

The electronic device assembly further includes a first mounting plate retainer and a second mounting plate retainer positioned on the mounting plate at different vertical positions with respect to each other. In the electronic device assembly, the first mounting keyhole and the second mounting keyhole have different geometric shapes. The first mounting keyhole is a pear shape and the second mounting keyhole is an L-shape. The larger receiving portion of the second keyhole is elongated and laterally aligned with both the larger receiving portion and smaller receiving portion of the first keyhole.

In an embodiment, the method of mounting an electronic device on a wall includes providing two differently shaped keyhole apertures on an underside surface of the electronic device. The electronic device is positioned toward the wall such that retainers on the wall enter the differently shaped keyhole apertures. The electronic device is then moved in two separate and distinct movements to cause the retainers to lock into smaller receiving portions of the differently shaped key apertures and thereby mount the electronic device on the wall.

The movements include at least one lateral movement to cause one of the two screw engaging keyhole apertures to receive the retainer into the smaller receiving portion, and at least one downward movement to cause the other of the two screw engaging keyhole apertures to receive the corresponding screw in the locked mounting position.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to wall mounts for electronic devices. A non-exhaustive exemplary list of such electronic devices can include, set top boxes, gateways, modems, routers, computers, thermostats, and/or any electronic device that can be wall mounted.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventors to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Reference in the specification to "one embodiment" or "an embodiment" of the present principles, as well as other variations thereof, means that a feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

Figure 1A:
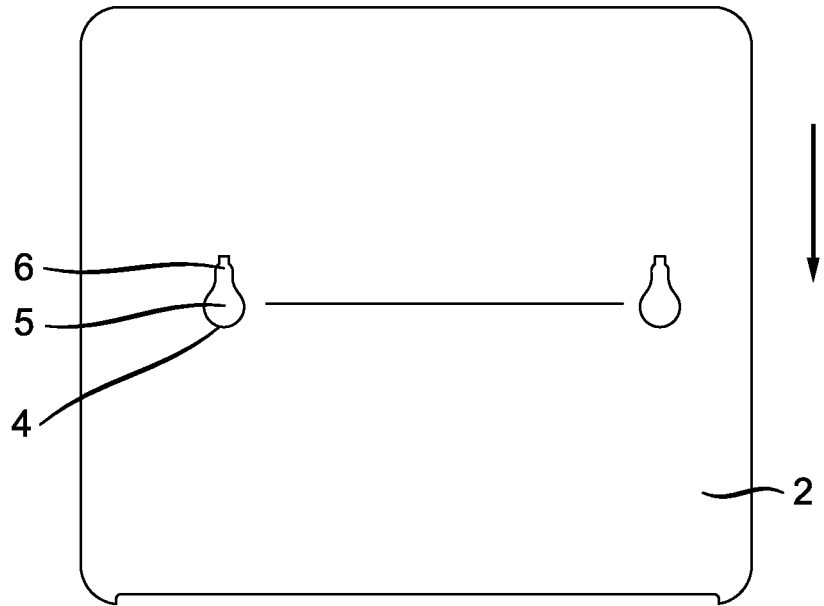
FIGS. 1A and 1B are plan views of an electronic device mounting plate according to the prior art.
Figure 1B:
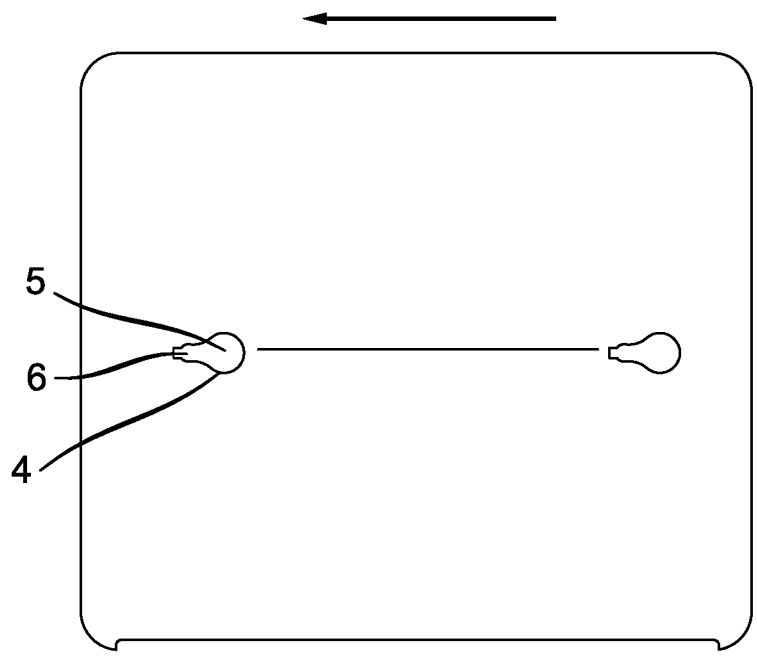

Referring to FIGS. 1A and 1B, there is shown the mounting plate 2 of an electronic device of the prior art. As shown, there are generally 2 keyhole wall mounts 4, that are generally pear shaped, each having a larger portion 5 that transitions to a smaller portion 6. The dimensions of the larger portion 5 are such that the head of a mounting screw (not shown) can fit into such opening, and the smaller portion is configured to receive the shaft of that mounting screw without allowing the head to pass through the same.

As shown in FIG. 1A, the wall mount keyholes 4 are laterally aligned (horizontally aligned) with each other and both are arranged or oriented similarly vertically. As such, two retainers, such as screws, (not shown) are put into the wall surface such that they are horizontally aligned with each other, the user places the larger portions 5 over the heads of the screws, and once inserted, one single downward motion will lock both screws into the smaller portions 6 of the respective wall mount keyholes.

FIG. 1B shows an alternative arrangement where the keyholes 4 are arranged or oriented similarly horizontally. Again, as they are both aligned with each other, the two screws are put into the wall surface such that they are horizontally (and laterally) aligned with each other. The user then places the larger portions 5 over the heads of the screws, and once inserted, one sideways motion (i.e., to the left depending on your perspective), will lock both screws into the smaller portions 6 of the respective wall mount keyholes.

With both above examples, it will be appreciated that the dislodging of the screws from the wall mount keyholes requires only one direction of motion. For example, referring to FIG. 1A, when the electronic device is mounted with this configuration, upward motion against the housing of the device can cause the screws to be dislodged from the wall mount keyholes, and thus unmount the electronic device. In the embodiment of FIG. 1B, a single sideways motion will be used to lock both screws into the two keyholes 4.

By way of further example, often the wall mounted electronic device has various wires or connections that need to be made to the same. These prior art "one-way" mounting systems can be compromised and become dislodged as a result of the force needed to connecting and disconnect of wires that are required for the respective device.

In other situation, the electronic device may include removable smart cards or even removable hard drives. These are often positioned on the front or side of the device. Thus, when the electronic device is mounted using the "one way" or single direction attachment method of the prior art as described above, the insertion and/or removal of the smart card or HDD can cause the accidental dislodging of the screws from the wall mount keyholes, and thus an undesired unmounting of the electronic device from the wall.

Throughout the following discussion, applicant uses the term screw and screw head as a useful example of a retainer to refer to the structure that engages the keyholes 16 and 18. As will be appreciated by those of ordinary skill in the art, other mounting hardware or structures such as hooks or other equivalent functional retaining devices can be used with corresponding keyholes without departing from the scope of the present disclosure.

Figure 2:
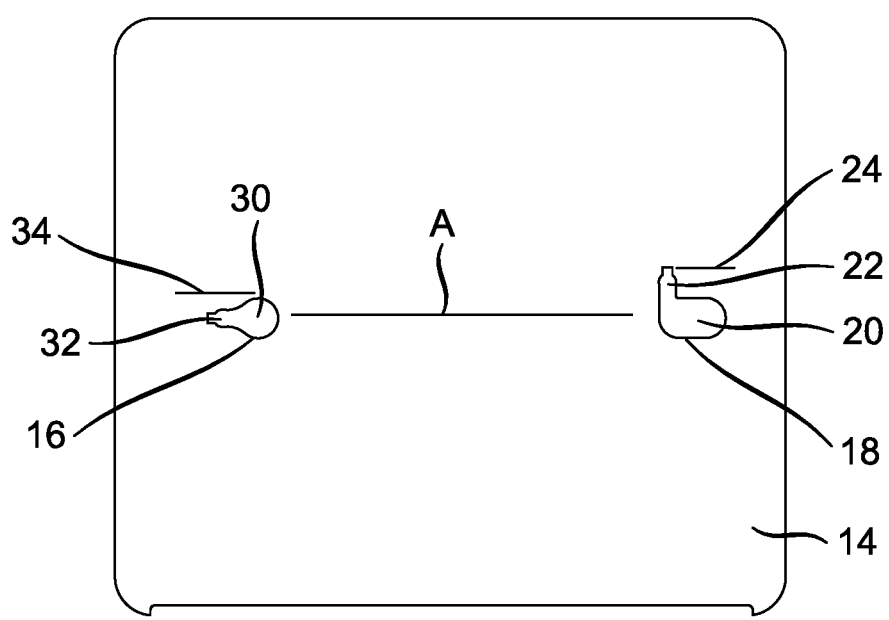
FIG. 2 is a plan diagram of the mounting plate of the electronic device in accordance with an implementation of the present principles.

Referring to FIG. 2 there is shown an electronic device mounting plate 14 according to an implementation of the present principles. The mounting plate 14 includes two (2) wall mount (mounting plate) keyholes 16 and 18 each having a different overall geometric shape. Keyhole 16 is generally pear shaped and arranged horizontally having a larger retainer (e.g. screw) head receiving aperture 30 transitioning into a smaller shaft receiving aperture 32. The upper edge of keyhole 16 is shown by line 34.

In this implementation, keyhole 18 has an "L shape" and is arranged differently than keyhole 16. Keyhole 18 includes a larger retainer (e.g. screw) head receiving aperture 20 transitioning into a smaller shaft receiving aperture 22, however this aperture 22 is positioned or oriented differently with respect to the larger aperture 20. In one embodiment, the orientation of the smaller shaft receiving aperture 22 of keyhole 18 is arranged at a right angle with respect to the orientation of smaller shaft receiving aperture 32 of keyhole 16. The upper edge of keyhole 18 (or upper edge of aperture portion 22), shown by line 24, is displaced from and not horizontally aligned with the upper edge 34 or any other part of keyhole 16. As will be described in more detail below, a portion of the retainer head receiving aperture 20 can be used as pivot point for a motion of mounting the electronic device.

As will be further evident from FIG. 2, the head receiving portion (i.e., aperture 20) of keyhole 18 is elongated and horizontally aligned with both the larger receiving portion (i.e., aperture 30) and smaller receiving portion (i.e., shaft receiving aperture 32) of the keyhole 16.

Figure 3:
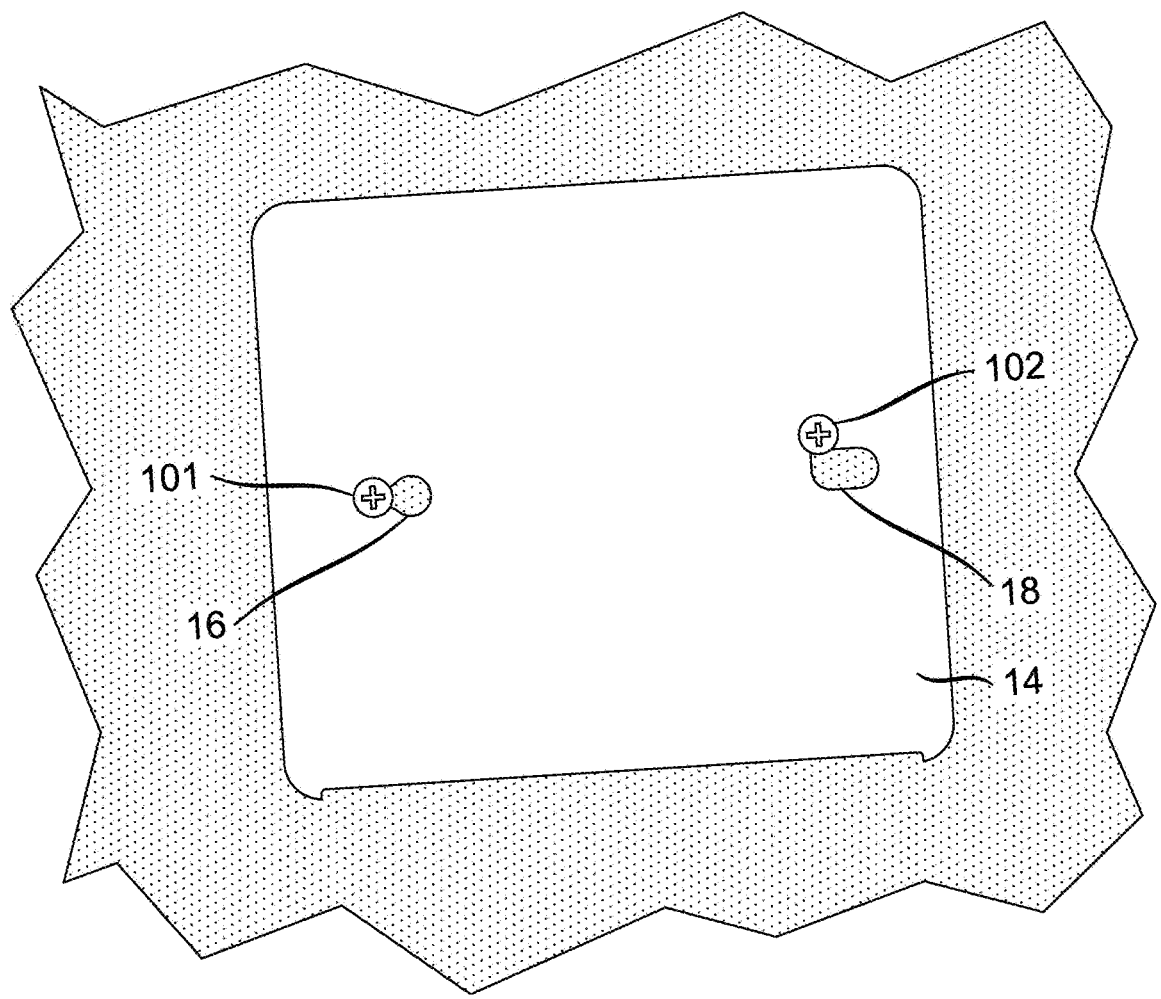
FIG. 3 is a plan view of an electronic device mounting plate, in the mounted position, according to an implementation of the present principles.

FIG. 3 shows a depiction of the mounting plate 14 mounted with screw heads 101 locked in position within the respective shaft receiving portions of the keyholes 16 and 18. FIGS. 4-7 will now be used to describe the method steps for mounting an electronic device using the mounting plate 14 of the present principles.

Figure 4:
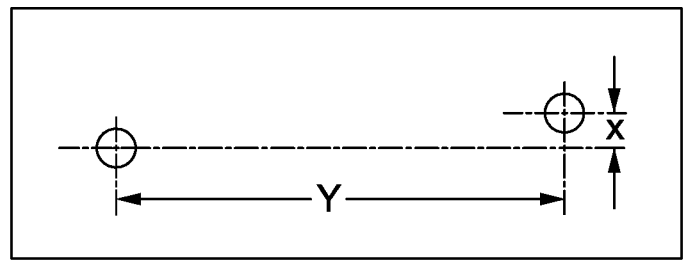
FIG. 4 is an example of a template used to mount the support screws to be received by the mounting plate of the electronic device according to the present principles.

FIG. 4 is an example of a mounting plate template that would be used for marking the location of the screws on a wall for mounting the electronic device with a mounting plate (14) in accordance with the present principles. As shown, there is a predetermined distance Y between the two mounting holes. Additionally, the right hole is vertically displaced from the left hole by a predetermined distance X. Using this template the user would mark the hole locations on a desired wall and install the two screws accordingly.

Figure 5:
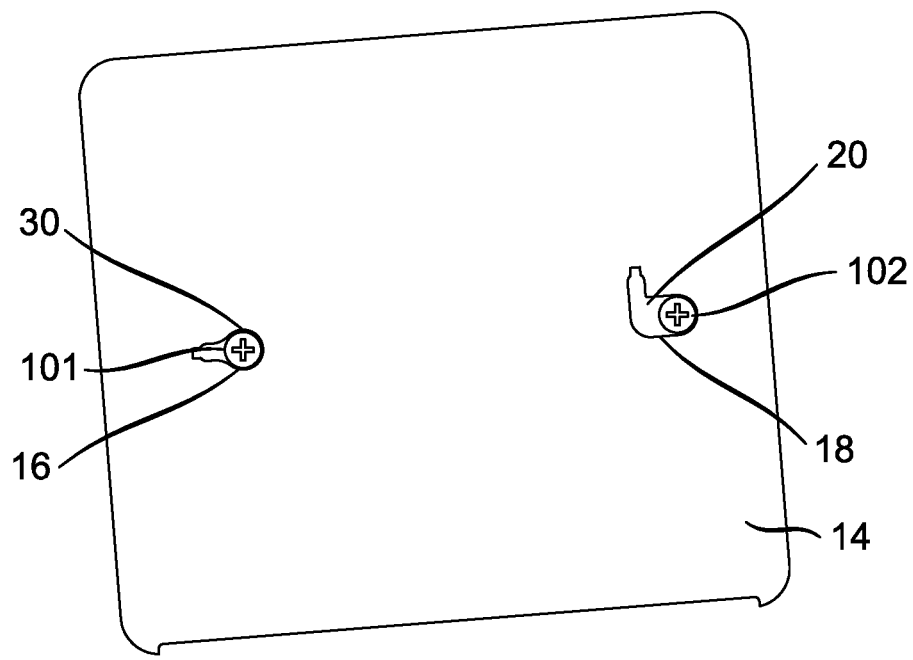
FIGS. 5-7 show the step by step installation of the mounting plate for an electronic device, in accordance with a preferred implementation of the present principles.

FIG. 5 shows the first step in the method where the large head receiving portions 30 and 20 of keyholes 16 and 20, respectively, are placed over the heads of the two screws 101 and 102. Note that the mounting plate 14 (and thereby the electronic device) is tilted or slightly rotated to allow for the simultaneous insertion of the heads of screws 101 and 102 into the larger head receiving portions 30 and 20 of keyholes 16 and 18, respectively.

Figure 6:
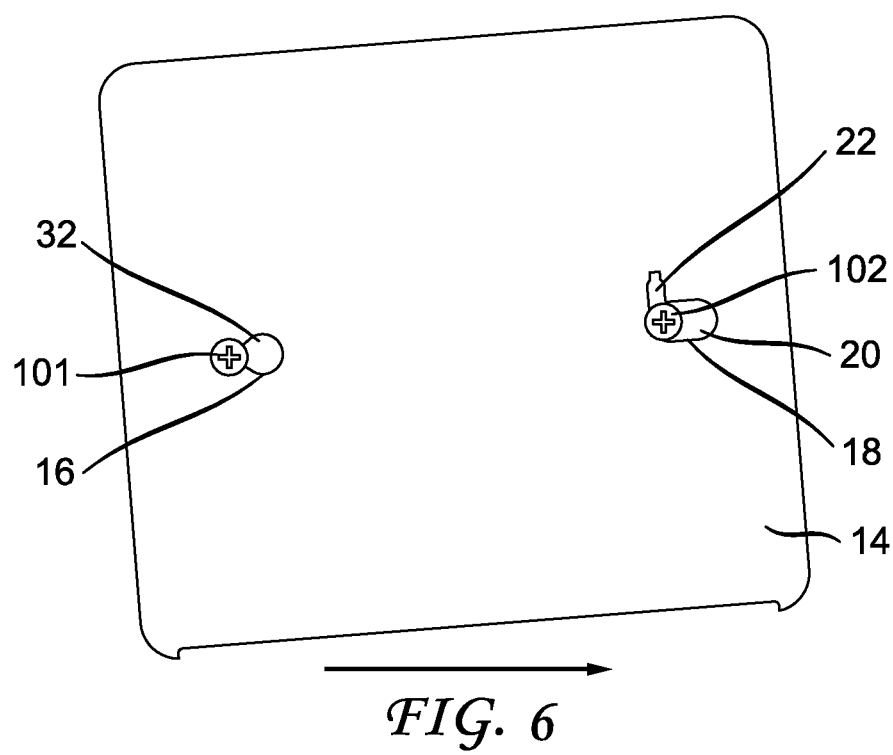

FIG. 6 shows the next step where the plate 14, while still in the slightly rotated position, is moved the right (from the wall perspective or the left if on the electronic device perspective), such that the shaft of the screw head 101 is received into the smaller portion 32 of keyhole 16. This first locking movement is generally horizontal (lateral) in direction. The screw head of screw 102 is now vertically aligned with the narrow portion 22 of the keyhole 18.

Figure 7:
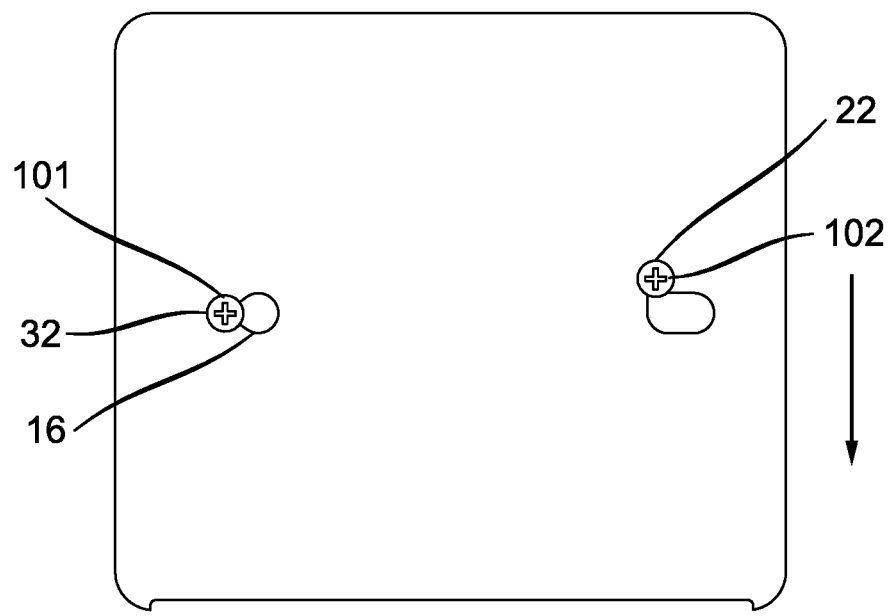

FIG. 7 shows the next step where the right side of the mounting plate 14 is pushed downward (or rotated back to a horizontally level position), causing the shaft of screw 102 to be locked into the smaller portion 22 of the keyhole 18 and thereby lock the mounting plate (and thus the electronic device) onto the wall. This second locking movement is generally vertical (downward) in direction. The above steps (two separate and distinct movements first a horizontal movement, then a vertical downward movement) and directions are reversed to remove the mounting plate (in one embodiment connected to an electronic device) from the wall. Thus, placing the mounting plate on a wall is accomplished with two separate and distinct movements; first a horizontal movement, then a vertical downward movement. These two movements result in the mounting plate being locked into place on a wall.

As will be appreciated from the above discussion, the mounting arrangement of the present principles requires an additional movement, than that of the prior art, to lock the screws into the two keyholes. Thus, which this arrangement, an electronic device mounted to a wall using the mounting plate of the present invention, cannot be accidentally (or even intentionally) dislodged from the wall by a single movement in any one direction.

Figure 8B:
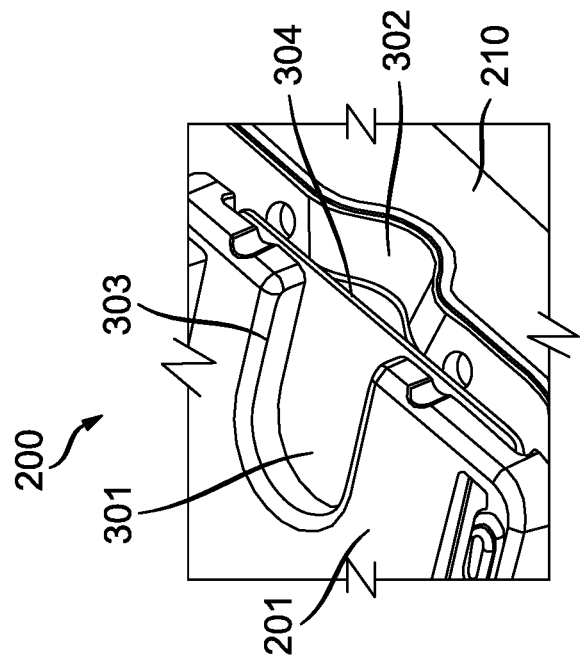
FIGS. 8A and 8B show an example of electronic device having a smart card reader and to which the mounting plate of the present principles can be applied.
Figure 8A:
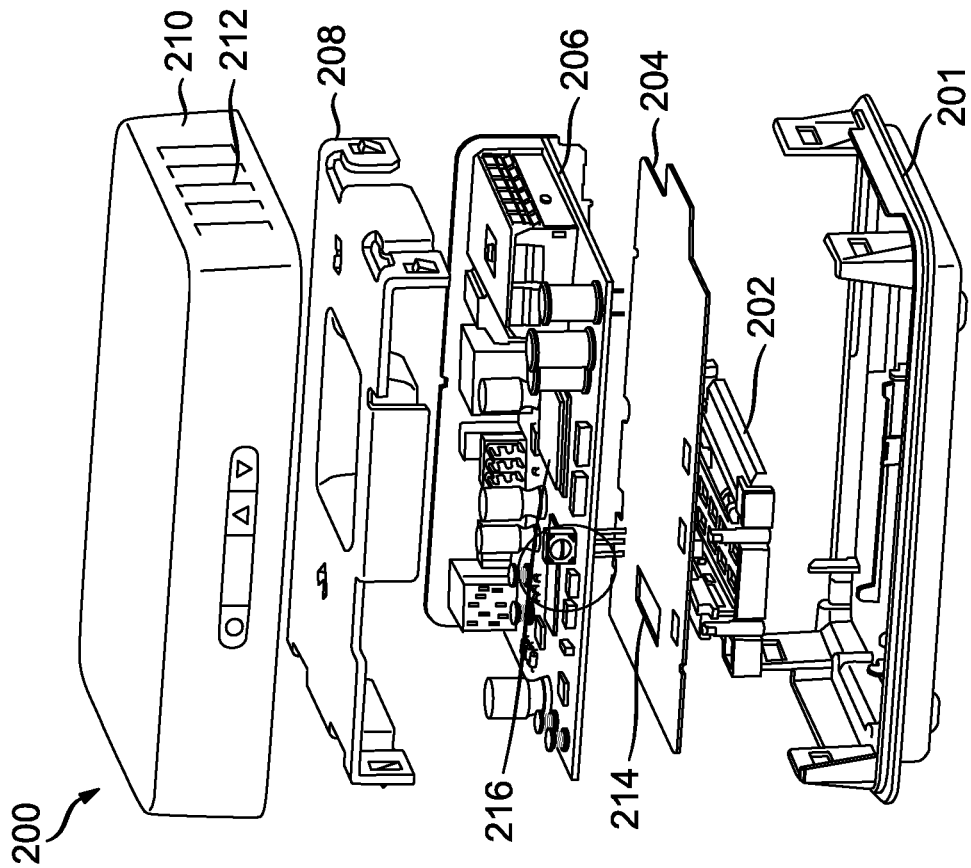

Thus, the disclosure can include the features of the set top box or electronic device 200 shown in reference to FIGS. 8A and 8B. FIG. 8A is a view of the device 200 disassembled to show how components can be positioned with respect to one another. In the device, a smart card reader 202 or the like (such as thumb drive port or hard drive port) can be positioned under a thermal insulator or barrier 204. The thermal barrier 204 can be positioned under a printed circuit board 206 and the smart card reader 202 can be connected to the printed circuit board 206 through an aperture 214 in the thermal barrier 204. The device 200 can have the internal components, which include the smart card reader 202, thermal barrier 204, printed circuit board 206, and a snap-in top broad heat sink 208 on the printed circuit board 206, positioned between the bottom frame 201 and the top cover 210.

Heat management, can also be important and as such with the device, vents can be included on the side walls to assist with heat extraction when the device is wall mounted. The bottom of the device is not shown in FIG. 8A. Anyway, the device can include the thermal barrier 204 that can be a thermally insulating material that preferably has substantially the same top plan view profile as the printed circuit board 206 or a profile that is at 80% of the profile of the printed circuit board 206. Also, the top heat sink 208 can have a top plan view profile that completely covers the printed circuit board or substantially covers the circuit board such that at least above 80% of the printed circuit board 206 is covered.

FIG. 8B also shows a bottom perspective view of the device 200. This illustrates how the smart card 301 can be inserted into or removed from the device 200. The smart card 301 is inserted into the smart card reader 202 through slot 304 which can be positioned on a side of the device. This card access region essentially includes the top cover 210 having a concave contour 302 curved toward the top of the set top to permit fingers to reach under a curved portion and over the smart card to grip the smart card 301. Additionally, the bottom frame 201 can have a complementary slot 303 on the bottom of the device that extends inward to permit fingers to reach under the smart card 301 to grip the smart card. The action of removing and inserting a smartcard or the like can cause the device to disengage from the wall, but with the disclosed mounting arrangement, the device is more difficult to dislodge with the linear insertion or removal motion. Thus, there is an advantage to having the mounting plate arrangement (14) built into the bottom of electronic device 200. The assembly of an electronic device and a mounting plate described herein addresses the problem of a movement in a single direction that could disengage a conventional wall-mounted electronic device from its mounted position.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Although the illustrative embodiments have been described herein with reference to the accompanying drawings, it is to be understood that the present principles are not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An electronic device mounting apparatus for mounting an electronic device on a wall of a structure, the electronic device mounting apparatus comprising:

an electronic device mounting plate including a first mounting aperture having a first geometric shape on a surface thereof, and a second mounting aperture in the same surface thereof and having a second geometric shape that is different from the first geometric shape;
wherein a smaller receiving portion of the first mounting aperture is vertically displaced from a smaller receiving portion of the second mounting aperture, the first mounting aperture and the second mounting aperture in horizontal arranged relationship, and wherein mounting the apparatus on the wall is accomplished with a lateral direction displacement of the mounting plate on the wall and a downward direction displacement of the mounting plate on the wall to lock the mounting plate onto the wall.

2. The electronic device mounting apparatus of claim 1, further comprising:
a first mounting plate retainer and a second mounting plate retainer positioned with the mounting plate, said first and second geometric shapes causing said first mounting plate retainer and second mounting plate retainer to be at different vertical positions on the mounting plate with respect to each other.

3. The electronic device mounting apparatus of claim 1, wherein the first geometric shape comprises one of a pear shape or an L-shape, and the second geometric shape comprises the other of the pear shape or L-shape.

4. The electronic mounting apparatus of claim 1, wherein at least a portion of said second geometric shape is not horizontally aligned with any part of the first geometric shape.

5. The electronic mounting apparatus of claim 1, wherein a larger receiving portion of the second mounting aperture is elongated and horizontally aligned with both a larger receiving portion of the first mounting aperture and the smaller receiving portion of the first mounting aperture.

6. An electronic device assembly for mounting on a wall of a structure, the electronic device assembly comprising:
an electronic device;
a first mounting aperture positioned in a mounting plate of the electronic device and having a first larger receiving portion transitioning to a first smaller receiving portion; and
a second mounting aperture positioned in the mounting plate of the electronic device and having a second larger receiving portion transitioning to a second smaller receiving portion;
wherein the first mounting aperture and the second mounting aperture are in horizontal arranged relationship, and an orientation of the first smaller receiving portion is different than an orientation of the second smaller receiving portion;
wherein the first smaller receiving portion of the first mounting aperture is vertically displaced from the second smaller receiving portion of the second mounting aperture, and wherein locking the mounting plate on the wall is accomplished with a lateral direction displacement of the mounting plate on the wall and a downward direction displacement of the mounting plate on the wall to lock the mounting plate onto the wall.

7. The electronic device assembly of claim 6, further comprising:
a first mounting plate retainer and a second mounting plate retainer positioned on the mounting plate at different vertical positions with respect to each other.

8. The electronic device assembly of claim 6, wherein the first mounting aperture and the second mounting aperture have different geometric shapes.

9. The electronic device assembly of claim 6, wherein the first mounting aperture comprises a pear shape and the second mounting aperture comprises an L-shape.

10. The electronic assembly of claim 6, wherein the second larger receiving portion of the second mounting aperture is elongated and laterally aligned with both the first larger receiving portion and the smaller receiving portion of the first mounting aperture.

11. A method of mounting an electronic device on a wall comprising:
providing two differently shaped horizontally positioned apertures on an underside surface of the electronic device;
positioning the electronic device toward the wall such that a first retainer and a second retainer mounted on the wall enter the differently shaped apertures, wherein a smaller receiving portion of a first mounting aperture is vertically displaced from a smaller receiving portion of a second mounting aperture;
moving the electronic device in two separate and distinct movements to cause the retainers to lock into the smaller receiving portions of the differently shaped apertures and thereby mount the electronic device on the wall;
wherein the two separate and distinct movements comprise;
one lateral movement causing the smaller receiving portion of the first mounting aperture to receive the first retainer; and
one downward movement causing the second receiving portion of the second mounting aperture to receive the second retainer such that the electronic device is placed in a locked mounting position.

12. The electronic device mounting apparatus of claim 1, wherein:
the first mounting aperture comprises a first mounting keyhole aperture; and
the second mounting aperture comprises a second mounting keyhole aperture.

13. The electronic device assembly of claim 6, wherein:
the first mounting aperture comprises a first mounting keyhole aperture; and
the second mounting aperture comprises a second mounting keyhole aperture.

* * * * *